United States Patent [19]
Igari et al.

[11] Patent Number: 5,896,967
[45] Date of Patent: Apr. 27, 1999

[54] ONE-WAY CLUTCH

[75] Inventors: Kozaburo Igari; Yoshio Kinoshita; Yasuhide Takasu, all of Shizuoka-ken, Japan

[73] Assignee: NSK-Warner K.K., Tokyo, Japan

[21] Appl. No.: 08/881,505

[22] Filed: Jun. 24, 1997

[30]     Foreign Application Priority Data

Jun. 26, 1996   [JP]   Japan ................................... 8-184254

[51] Int. Cl.$^6$ .................................................. F16D 41/07
[52] U.S. Cl. ...................... 192/45.1; 192/41 A; 188/82.8
[58] Field of Search ................................ 192/45.1, 41 A; 188/82.8

[56]                References Cited

U.S. PATENT DOCUMENTS

| | | | |
|---|---|---|---|
| 3,219,163 | 11/1965 | Zlotek | 192/45.1 |
| 5,758,755 | 6/1998 | Igari | 192/45.1 |
| 5,765,670 | 6/1998 | Fujiwara et al. | 192/45.1 |

Primary Examiner—Richard M. Lorence
Attorney, Agent, or Firm—Vorys, Sater, Seymour and Pease LLP

[57]                ABSTRACT

A one-way clutch is provided with a retainer formed with a holding hole for holding a sprag biting between an outer race and an inner race. The retainer further has a sprag restraining piece intervening between the outer race and the inner race. The sprag restraining piece protrudes radially outwardly of the retainer and resiliently bears against the sprag so that the sprag is held between the holding hole and the sprag restraining piece and urged in a direction to bite between the outer race and the inner race. The retainer serves to hold the sprag in the holding hole and also serves to prevent the sprag from coming off the holding hole by the sprag restraining piece and causes the sprag to bite between the outer race and the inner race. Portions of the retainer serve multiple roles when compared to prior retainers and, therefore, the number of parts of the one-way clutch is decreased and the structure thereof becomes simple and the assembly thereof is simplified.

8 Claims, 6 Drawing Sheets

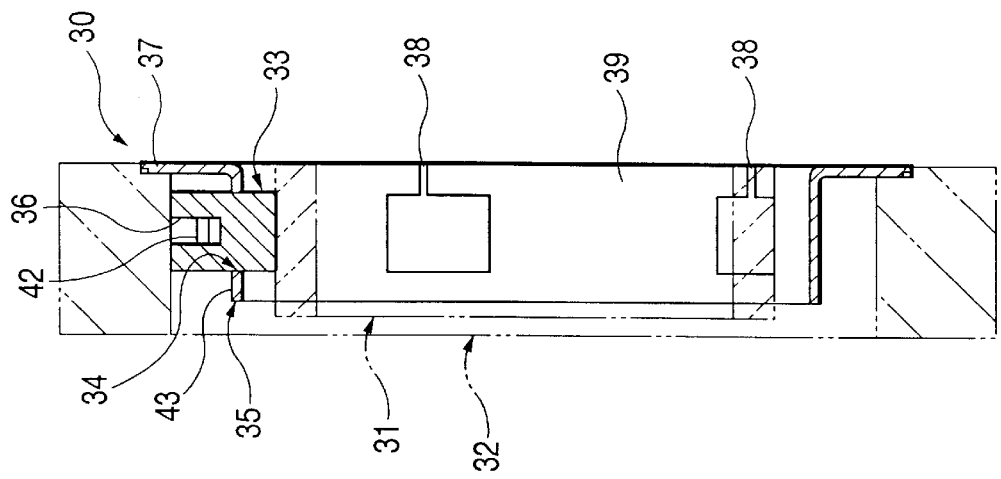
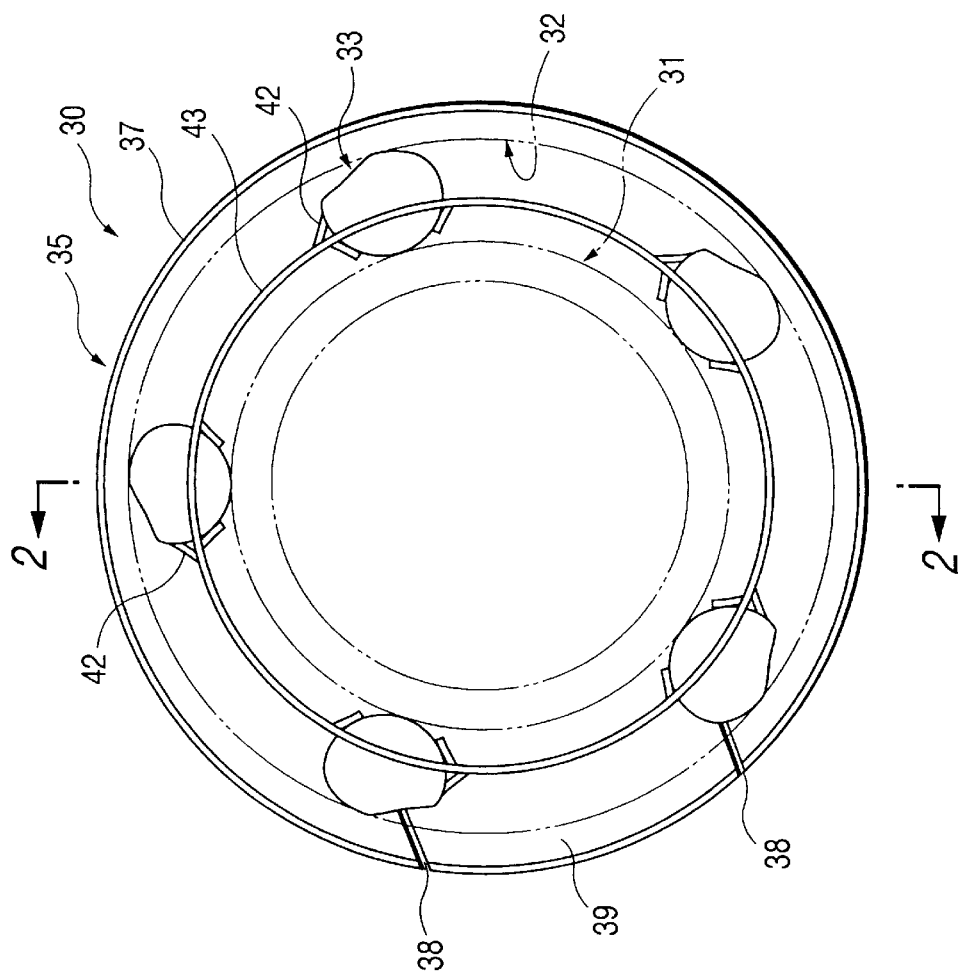

PRIOR ART
FIG. 12
PRIOR ART
FIG. 13
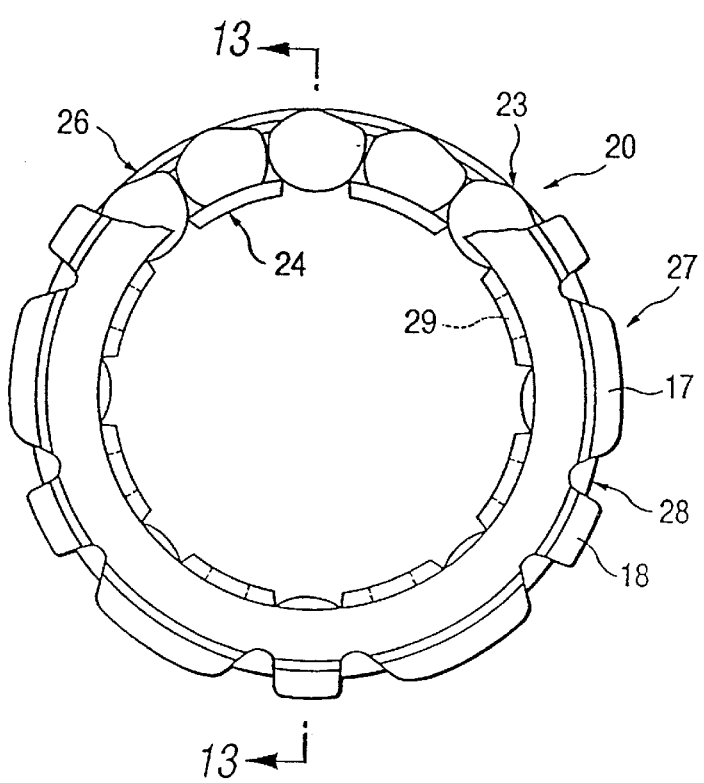
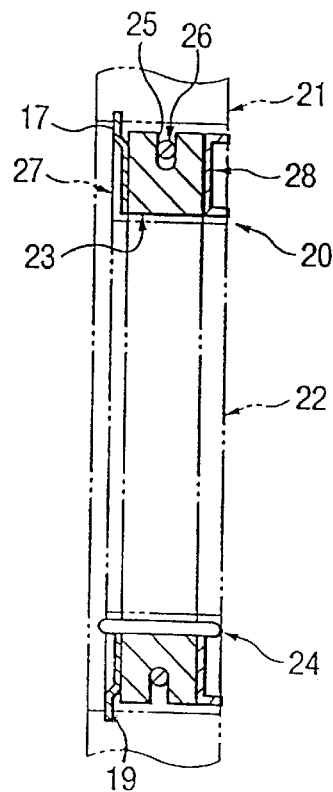
PRIOR ART
FIG. 14
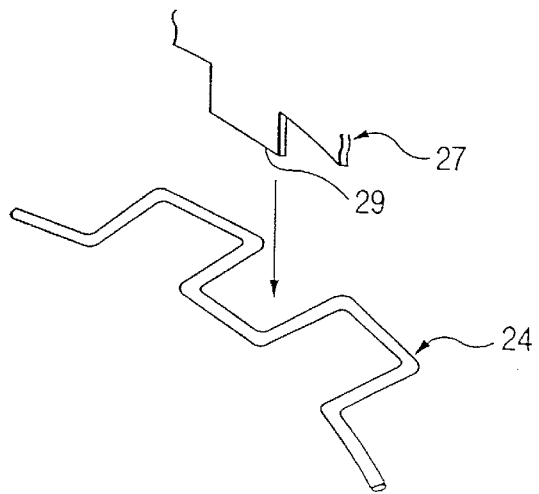

ized and protrudes radially outwardly of the retainer 35.

5,896,967

ONE-WAY CLUTCH

BACKGROUND OF THE INVENTION

1. Field of the Invention

This invention belongs to the technical field of a one-way clutch incorporated, for example, between the drive shaft and the driven shaft, of an automobile, an ordinary industrial machine, or the like, for transmitting power to the driven shaft only when the drive shaft rotates in a predetermined direction.

2. Related Background Art

A one-way clutch according to the prior art, as shown in FIGS. 12 to 14 of the accompanying drawings, is usually provided with a sprag 23 biting between an outer race 21 and an inner race 22, an annular wire cage 24 holding this sprag 23, a ring-like spring 26 engaged with a spring engagement groove 25 formed in the sprag 23 and holding the sprag 23 between itself and the wire cage 24, and two ring-like side plates 27 and 28 holding the sprag 23 therebetween on the axial opposite sides thereof.

The wire cage 24 is formed with a wire bent so that opening portions may alternately face axial opposite sides of the outer race 21 and the inner race 22. A plurality of projected pieces 29 are inwardly projectedly provided on the inner peripheries of the side plates 27 and 28. These projected pieces 29 are engaged with wire cage 24, whereby the side plates 27 and 28 are incorporated into the wire cage 24.

A plurality of radially protruding resilient projected pieces 17, 18 are formed on the outer periphery of the side plate 27. When these resilient projected pieces 17, 18 are inserted into a groove 19 formed in the side of the outer race coaxially with the outer race, the wire cage 24 is positioned relative to the outer race 21 by the resilient forces of the bent resilient projected pieces 17, 18.

The sprag 23 is inserted from the outside into the wire cage 24 into which the side plate 27 is incorporated in advance, whereafter the spring 26 is mounted from the outside of the sprag 23, whereby the sprag 23 is prevented from coming off the wire cage 24 and is mounted on the wire cage 24.

However, such a one-way clutch 20 suffers from the following problems:

(1) The one-way clutch is comprised of an inner race, an outer race, a plurality of sprags 23, a wire cage 24 and a spring 26 and therefore, the number of parts is great.

(2) When the sprags 23 are to be mounted on the wire cage 24, the spring 26 is brought into engagement with each spring engagement groove 25 from the outside of each sprag 23 and therefore, the assembly requires much time and labor.

SUMMARY OF THE INVENTION

The present invention solves the above-noted problems in one embodiment by providing a one-way clutch provided with a retainer formed with a holding hole for holding a sprag biting between an outer race and an inner race. The retainer has a sprag restraining piece intervening between the outer race and the inner race. The sprag restraining piece protrudes radially outwardly of the retainer and resiliently bears against the sprag so that the sprag is held between the holding hole and the sprag restraining piece and urged in a direction to bite between the outer race and the inner race.

The holding hole of the retainer serves as the conventional wire cage holding the sprag and serves also as the conventional side plates blocking the movement of the sprag in the axial direction of the clutch.

The sprag restraining piece bears against the sprag to thereby prevent the sprag from coming off the holding hole.

Also, the sprag restraining piece has resiliency urging the sprag in a direction to bite between the outer race and the inner race. Therefore, when the direction of relative rotation of the outer race and the inner race changes to a direction to bite at the sprag, the sprag is quickly bitten between the outer race and the inner race and the one-way clutch immediately transmits a drive force.

Accordingly, the sprag restraining piece plays a similar role as the conventional spring.

BRIEF DESCRIPTION OF THE DRAWINGS

FIG. 1 is a schematic front view of a one-way clutch according to a first embodiment of the present invention.

FIG. 2 is a cross-sectional view taken along the line 2—2 of FIG. 1.

FIG. 12 is a front view of a retainer in a one-way clutch according to the prior art.

FIG. 13 is a cross-sectional view taken along the line 13—13 of FIG. 12 showing a one-way clutch according to the prior art.

FIG. 14 is a fragmentary perspective view of the wire cage and one side plate of the one-way clutch of FIG. 12.

DESCRIPTION OF THE PREFERRED EMBODIMENTS

Figure 3:
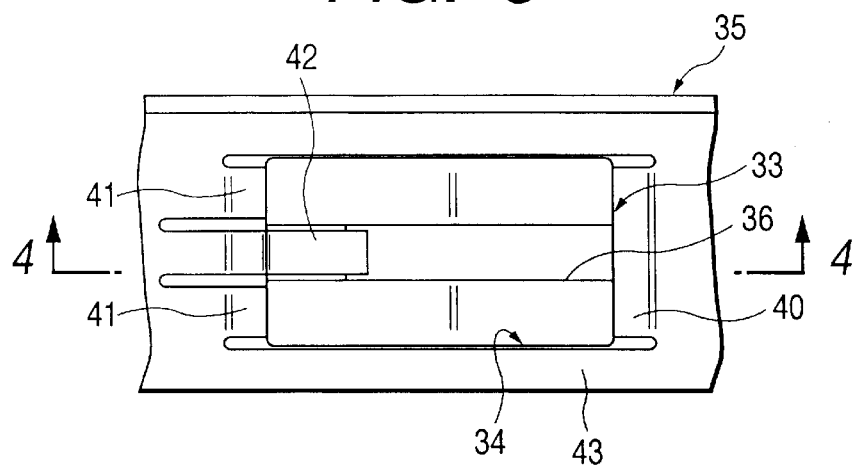
FIG. 3 is a plan view of a portion of the FIG. 1 clutch showing a sprag.

Some embodiments of the present invention will hereinafter be described with reference to FIGS. 1 to 11.

A one-way clutch 30, as shown in FIGS. 1 to 4, is provided with an inner race 31, an outer race 32, a sprag 33 biting between the inner and outer races, and a retainer 35 formed with a holding hole 34 for holding the sprag 33.

The retainer 35 is made of a thin iron plate and is comprised of a flange 37 and a cylinder portion 43. The cylinder portion 43 is formed with the holding hole 34.

The flange 37 of the retainer 35 is formed with a protruding piece 39. This protruding piece 39 is separated from the other portion of the flange 37 by a pair of slits 38 and 38 and protrudes radially outwardly of the retainer 35.

When the retainer 35 is inserted into the outer race 32 and the flange 37 is mounted in the counterbore of the outer race 32, the protruding piece 39 presses the inner periphery of the counterbore and positions the retainer 35 relative to the outer race 32.

Figure 11:
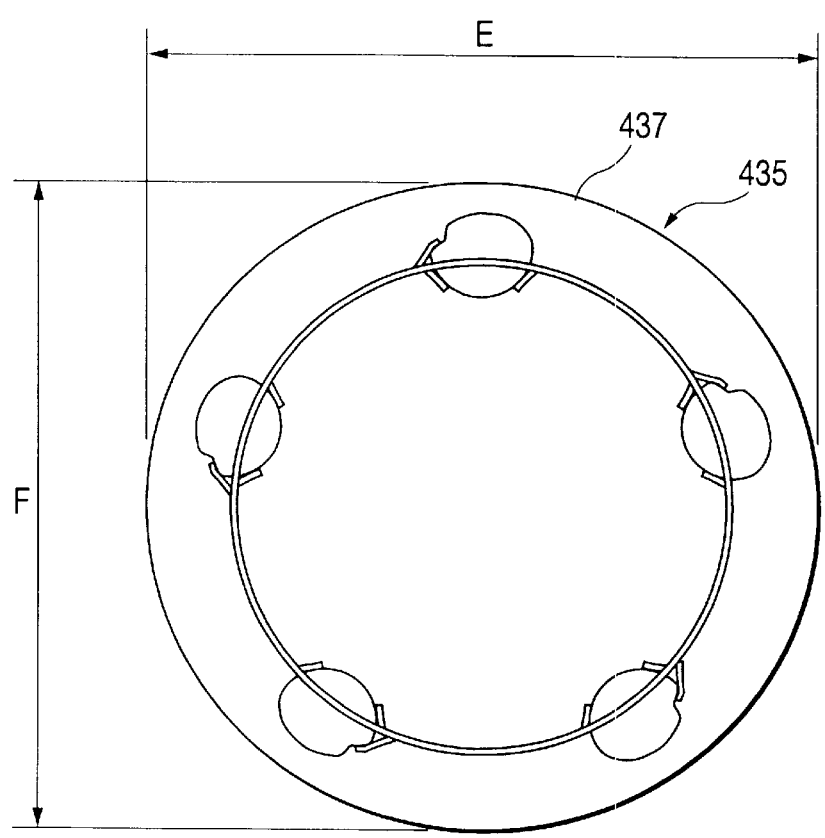
FIG. 11 is a front view of a retainer in another embodiment of the present invention.

Instead of forming the protruding piece 39 on the flange, like a retainer 435 shown in FIG. 11, the diameter E of a flange 437 may be made more or less larger than a diameter F and the flange 437 may be made into an elliptical shape, and the inner periphery of the counterbore may be pressed by a portion of a large diameter to thereby effect the positioning of the retainer 435 relative to the outer race.

Figure 4:
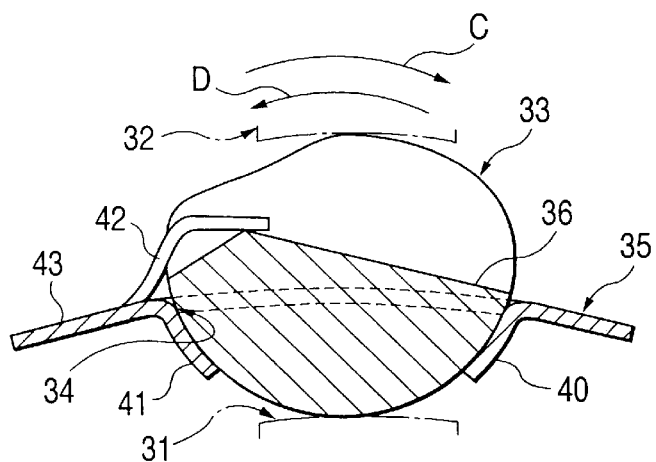
FIG. 4 is a cross-sectional view taken along the line 4—4 of FIG. 3.

Referring to FIGS. 3 and 4, sprag receiving pieces 40, 41, 41 for receiving the sprag 33 are formed on the right and left edges of the holding hole 34. Two sprag receiving pieces 41 are formed on the left edge of the holding hole 34. A sprag restraining piece 42 protruding radially outwardly of the retainer 35 is formed between the two sprag receiving pieces 41 and 41.

The sprag restraining piece 42 extends in the circumferential direction of the retainer 35 and is disposed in a restraining piece receiving groove 36 formed in the sprag 33 and bears against the sprag 33.

The sprag restraining piece 42 has resiliency urging the sprag 33 in a direction to bite between the outer race 32 and the inner race 31.

The sprag 33 is mounted in the holding hole 34 from the inside or the outside of the retainer 35 and is prevented from coming off the holding hole 34 by the sprag restraining piece 42.

The sprag coming-off preventing piece 42 has resiliency urging the sprag 33 in a direction to bite between the outer race 32 and the inner race 31 and prevents the sprag 33 from coming off the holding hole 34 and therefore, plays the a similar role as the conventional spring 26 (see FIG. 12).

The retainer 35 having a plurality of sprags 33 mounted thereon is handled as a part during the assembly of the one-way clutch 30.

When the one-way clutch 30 is incorporated between a drive shaft and a driven shaft and a rotational force is applied to the outer race 32 or the inner race 31, a rotational force in the direction of arrow C or D of FIG. 4 is applied to the sprags 33.

When the rotational force in the direction of arrow C is applied to the sprags 33, the sprags 33 rotate more or less in the direction of arrow C against the resilient force of the sprag restraining piece 42.

However, since slippage occurs between the sprags 33 and the outer race 32 and between the sprags 33 and the inner race 31, the sprags 33 do not effect transmission of the rotational force between the outer race 32 and the inner race 31.

When the application of the rotational force in the direction of arrow C becomes null, the sprags 33 are pushed back by the sprag restraining piece 42, and when the rotational force in the direction of arrow D is applied, the sprags immediately return to a posture in which they bite between the outer race 32 and the inner race 31.

Accordingly, when the rotational force in the direction of arrow D is applied to the sprags 33, the sprags 33 bite between the outer race 32 and the inner race 31, thus making the outer race 32 and the inner race 31 integral with each other and effecting transmission of torque.

Figure 5:
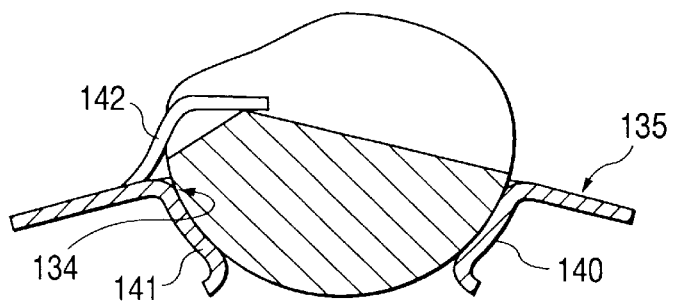
FIG. 5 is a view corresponding to FIG. 4 but showing the state of engagement between the sprag and sprag coming-off preventing piece of a one-way clutch according to another embodiment of the present invention.

Sprag receiving pieces, like sprag receiving pieces 140, 141, 141 shown in FIG. 5, may be provided with arcuate portions at the tip ends thereof so as not to injure the sprags 33, and the sprag receiving pieces themselves may be reinforced.

Figure 6:
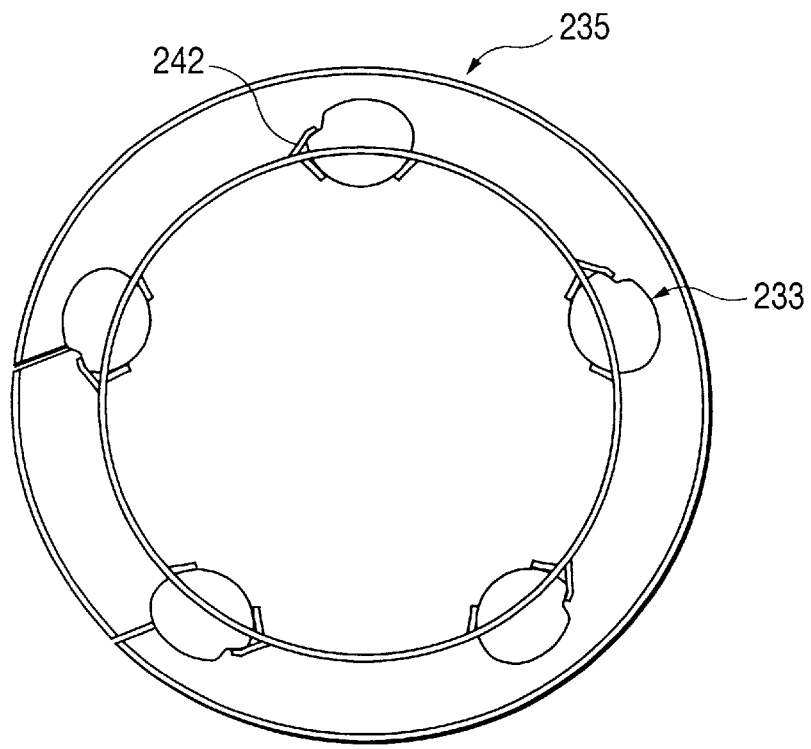
FIG. 6 is a front view of a retainer holding a sprag in a one-way clutch according to another embodiment of the present invention.
Figure 7:
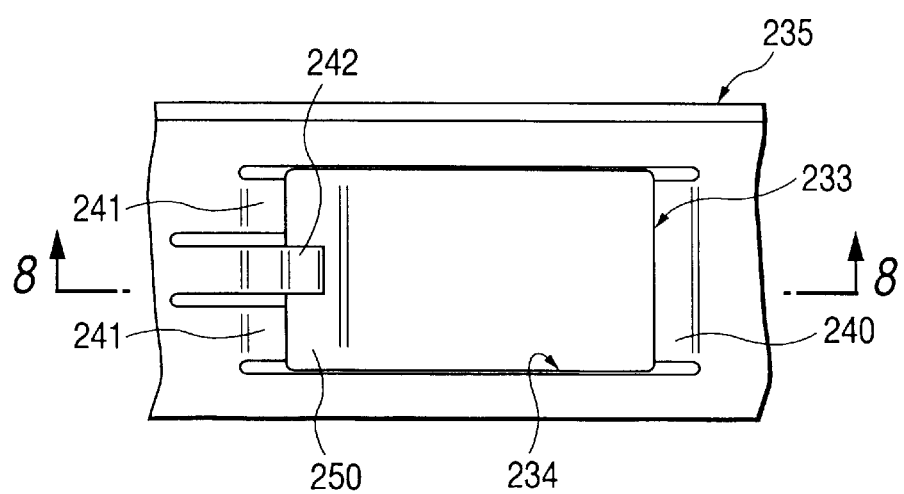
FIG. 7 is a plan view of a portion of the FIG. 6 retainer including the sprag.
Figure 8:
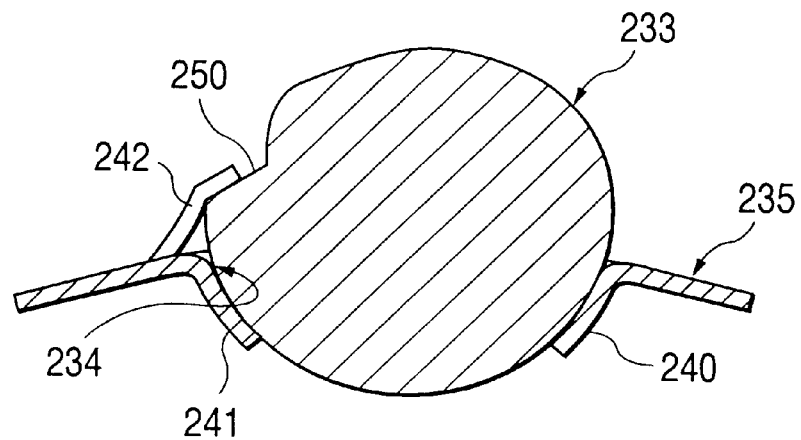
FIG. 8 is a cross-sectional view taken along the line 8—8 of FIG. 7.

Also, as the sprags, use may be made of sprags 233, as shown in FIGS. 6 to 8, which are not formed with restraining piece receiving grooves. However, the sprags 233 in this case are formed with stepped portions 250 against which the sprag restraining piece 242 bears.

This sprag restraining piece 242 also extends in the circumferential direction of a retainer 235, but does not come into the restraining piece receiving groove and correspondingly is shorter than the sprag restraining piece 42 shown in FIGS. 1 to 4.

Figure 9:
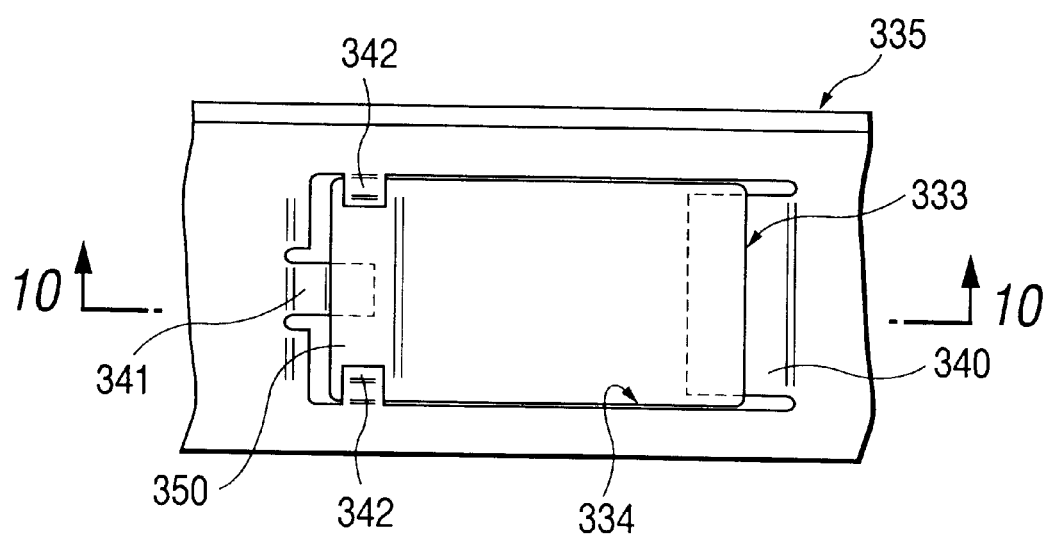
FIG. 9 is a plan view of a one-way clutch according to another embodiment of the present invention showing a portion of a sprag.
Figure 10:
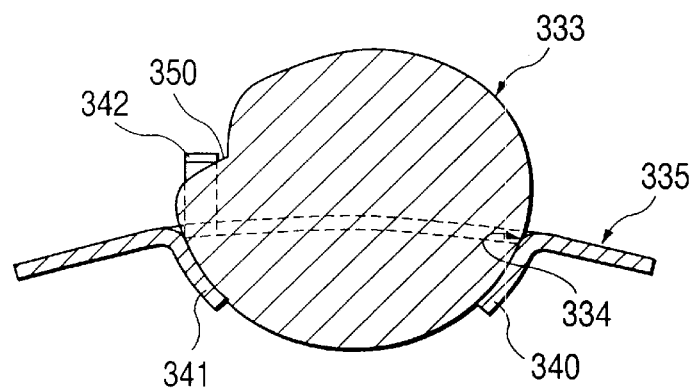
FIG. 10 is a cross-sectional view taken along the line 10—10 of FIG. 9.

Further, the sprag restraining piece, as shown in FIGS. 9 and 10, may be a pair of sprag restraining pieces 342 and 342 formed into an L-shape so as to embrace a sprag 333 from the direction of thickness of the sprag 333. In this case, the pair of sprag restraining pieces 342 extends in the axial direction of a retainer 335.

The sprags 333 used in these sprag restraining pieces 342 are not formed with restraining piece receiving grooves. The sprags 333 are formed with stepped portions 350 against which the sprag restraining pieces 342 bear.

The sprag receiving pieces 40, 41, 41; 140, 141, 141; 240, 241, 241; 340, 341 and the sprag restraining pieces 42, 142; 242; 342, 342 are formed by bending a portion of the retainer when the holding hole 34; 134; 234, 334 of the retainer 35; 135; 235; 335 is formed.

A one-way clutch of the present invention can achieve the following effects:

(1) the holding hole of the retainer plays similar roles as that of the conventional wire cage holding the sprag and that of the conventional side plates blocking the movement of the sprags in the axial direction of the clutch and therefore, as compared with the prior art, the number of parts can be decreased to thereby simplify the structure.

(2) The sprag restraining piece plays a similar role as the conventional spring and therefore, the spring required in the prior art becomes unnecessary and thus, the number of parts of the one-way clutch can be decreased to simplify the structure thereof.

(3) By the spring being eliminated, it becomes unnecessary to bring the spring into engagement with the sprags and thus, the work of assembling the one-way clutch is simplified.

Also, when the sprag restraining piece is projectedly provided in the circumferential direction of the retainer and bears against a stepped portion formed on the sprag, it becomes unnecessary to form the heretofore required engagement groove in the sprag, and the manufacture of the sprag is simplified.

Further, when the sprag restraining piece is projectedly provided in the axial direction of the retainer and bears against a stepped portion formed on the sprag, it becomes unnecessary to form the heretofore required engagement groove in the sprag, and the manufacture of the sprag becomes easy.

Still further, when the sprag restraining piece is projectedly provided in the circumferential direction of the retainer and comes into the restraining piece receiving groove, a conventional sprag provided with a spring engagement groove can be intactly used as the sprag.

What is claimed is:

1. A one-way clutch provided with a retainer formed with a holding hole for holding a sprag biting between an outer race and an inner race, said retainer further having a sprag restraining piece intervening between said outer race and said inner race, said sprag restraining piece protruding radially outwardly of said retainer and resiliently bearing against said sprat so that said sprag is held between said holding hole and said sprag restraining piece and urged in a direction to bite between said outer race and said inner race.

2. The one-way clutch of claim 1, wherein said sprag restraining piece projects in a circumferential direction of said retainer and bears against a stepped portion formed on said sprag.

3. The one-way clutch of claim 1, wherein said sprag restraining piece projects in an axial direction of said retainer and bears against a stepped portion formed on said sprag.

4. The one-way clutch of claim 1, wherein said sprag restraining piece projects in a circumferential direction of said retainer and is received in a restraining piece receiving groove formed in said sprag.

5. A one-way clutch provided with a retainer formed with a holding hole for holding a sprag biting between an outer race and an inner race, said retainer further having a sprag restraining piece intervening between said outer race and said inner race, said sprag restraining piece protruding radially outwardly of said retainer and resiliently bearing against said sprag so that said sprag is held between said holding hole and said sprag restraining piece and urged in a direction to bite between said outer race and said inner race, wherein said holding hole is disposed nearer to said inner race than said outer race.

6. The one-way clutch of claim 5, wherein said sprag restraining piece projects in a circumferential direction of said retainer and bears against a stepped portion formed on said sprag.

7. The one-way clutch of claim 5, wherein said sprag restraining piece projects in an axial direction of said retainer and bears against a stepped portion formed on said sprag.

8. The one-way clutch of claim 5, wherein said sprag restraining piece projects in a circumferential direction of said retainer and is received in a restraining piece receiving groove formed in said sprag.

\* \* \* \* \*